3,292,073
VOLTAGE-MULTIPLIER RECTIFIER CIRCUITS
Royston Everard Jones, Mapledurham, and Ronald Thomas Waters, Earley, Reading, England, assignors to Associated Electrical Industries Limited, London, England, a British company
Filed Aug. 15, 1963, Ser. No. 302,328
Claims priority, application Great Britain, Aug. 31, 1962, 33,579/62
5 Claims. (Cl. 321—15)

This invention relates to improvements in voltage-multiplier rectifier circuits, and has for its object the provision of such a circuit having an improved percentage voltage regulation, over a given range of design loads, compared with orthodox circuits.

According to the present invention, a voltage multiplier rectifier circuit comprises a pair of input terminals between which an alternating supply voltage can be applied, a pair of direct current output terminals, a reservoir capacitor connected across the two output terminals, and two similarly directed direct current charging paths for that capacitor and each joining the two output terminals, each D.C. charging path including a series chain of "$n$" capacitors interposed between two rectifiers, the junction point of one of the rectifiers and the adjacent capacitor in one of the D.C. paths being connected to one of the input terminals and the similar junction point in the other path being connected to the second of the input terminals, and each pair of consecutive series connected capacitors in each D.C. path being shunted by two series connected rectifiers the junction point of which is connected to the junction point of the corresponding pair of capacitors in the other D.C. path, whereby the reservoir capacitor tends to charge to ($n+1$) times the peak value of the voltage applied to the input terminals.

The invention will now be described, by way of example, with reference to the accompanying drawings, in which.

Figure 1:
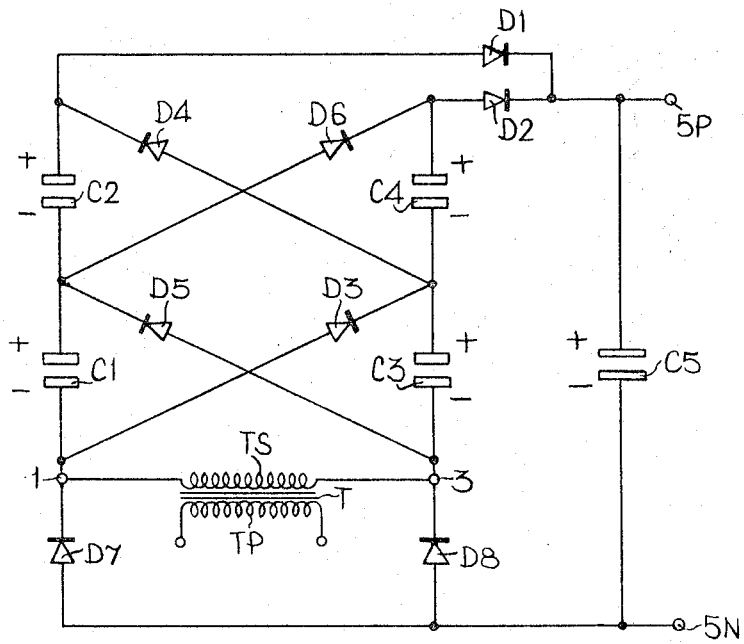
FIGURE 1 is a circuit diagram of a voltage-multiplier rectifier circuit.

Referring first to FIGURE 1, the power input to the circuit is through a transformer T, the primary winding TP of which is connected to a suitable source of alternating current and the secondary winding TS of which has its ends connected respectively to two input terminals 1 and 3. The terminal 1 is connected through a series chain consisting of a capacitor C1 and a capacitor C2 to the anode of a rectifier D1 the cathode of which is connected to the positive direct current output terminal 5P of the circuit. The terminal 3 is connected through a series chain consisting of a capacitor C3 and a capacitor C4 to the anode of a rectifier D2 the cathode of which is connected to the terminal 5P. Terminal 1 is connected to the anode of a rectifier D3 the cathode of which is connected to the junction of capacitors C3 and C4 and to the anode of a rectifier D4 the cathode of which is connected to the junction of capacitor C2 and the rectifier D1. Terminal 3 is connected to the anode of a rectifier D5 the cathode of which is connected to the junction of the capacitors C1 and C2 and to the anode of a rectifier D6 the cathode of which is connected to the junction of capacitor C4 and rectifier D2. Terminal 1 is also connected to the cathode of a rectifier D7 the anode of which is connected to the negative direct current output terminal 5N of the circuit, and terminal 3 is similarly connected to the cathode of a rectifier D8 the anode of which is connected to terminal 5N. A reservoir capacitor C5 is connected between the terminals 5P and 5N.

In use of the circuit described above, an alternating voltage applied across the primary winding TP of transformer T produces an alternating E.M.F. in the secondary winding TS so that an alternating voltage of peak value V volts is applied between terminals 1 and 3.

Considering first the action of capacitors C1 and C3 and rectifiers D3 and D5, it will be seen that during those half cycles of the supply when terminal 1 is positive with respect to terminal 3, the capacitor C3 will charge up with the polarity shown to the peak voltage V, while during the remaining half cycles the capacitor C1 will charge up with the polarity shown to the peak voltage V.

Considering now how this action is modified by the capacitors C2 and C4 and the rectifiers D4 and D6, it will be seen that during those half cycles when terminal 1 is positive with respect to terminal 3, a voltage equal to the sum of the E.M.F. V in winding TS and the voltage V across capacitor C1 is applied across the series combination of capacitors C4 and C3, so that each is then charged to the voltage V. Similarly, during the remaining half cycles, the capacitors C1 and C2 are both charged up to the voltage V.

Considering now the reservoir capacitor C5, since this is fed only through the two diodes D1 and D2, it can be charged only to the polarity shown. During the half cycles when terminal 1 is positive with respect to terminal 3, the voltage applied to the reservoir capacitor C5 is the sum of voltages V across capacitor C4, V across capacitor C3, and V induced in the winding TS. Thus the capacitor C5 is charged to a voltage of 3 v. Similarly, in the remaining half cycles, the sum of the voltages in capacitors C2 and C1 and that induced in the winding TS charges capacitor C5 up to a voltage of 3 v.

It has been found that with the arrangement described the output voltage between terminals 5P and 5N has only a low superimposed ripple and, when the load current taken through terminals 5P and 5N is zero, the output voltage is 3 v. compared with an output voltage of 2 v. which would be provided by an equivalent full wave voltage doubler circuit. At the same time, the numerical value of the voltage regulation remains about the same, so that the percentage voltage regulation is improved.

Figure 2:
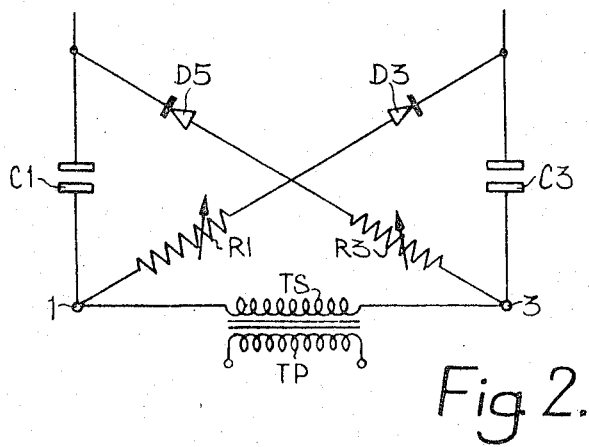
FIGURE 2 is a drawing of a modified part only of the circuit of FIGURE 1.

The rectifiers shown in FIGURE 1 can be of any suitable type, and can be for example metal rectifiers. However, when metal rectifiers are used for items D3, D4, D5 and D6, it may be found that the voltages appearing at the anodes of the two rectifiers D1 and D2 are unequal, due to imperfections in the metal rectifiers. The modification shown in FIGURE 2 enables any such inequality to be balanced out, and comprises the insertion of variable resistors R1 and R2 respectively in the connection between terminal 1 and rectifier D3 and in the connection between terminal 3 and the rectifier D5.

It is desirable that the rectifiers D1 and D2 shall be vacuum tube diodes, since otherwise the reverse leakage of the metal rectifiers used elsewhere in the circuit can give rise to a ripple superimposed on the output voltage, even under no-load conditions.

In a practical circuit it will usually be found desirable from the point of view of efficient smoothing to earth the terminal 5N. The polarity of the output can be reversed by reversing all the rectifiers.

What we claim is:
1. A voltage multiplier rectifier circuit comprising:
  (a) first and second input terminals between which an alternating supply can be applied;
  (b) first and second direct current output terminals;
  (c) a reservoir capacitor connected across the first and second output terminals;
  (d) a first rectifier connected between the first input terminal and the first output terminal;

(e) a second rectifier connected between the second input terminal and the first output terminal in the same sense or direction as the first rectifier;

(f) a third rectifier connected by one pole to the second output terminal;

(g) a fourth rectifier connected by one pole to the second output terminal in the same sense or direction as the third rectifier;

(h) a first direct current charging path extending between the first and second output terminals through the first and third rectifiers and a series chain of "$n$" capacitors interposed between these two rectifiers;

(i) a second direct current charging path extending between the first and second output terminals, in the same sense or direction as the first charging path, and extending through the second and fourth rectifiers and a series chain of "$n$" capacitors interposed between these two rectifiers;

(j) shunting rectifiers, $2n$ in number, series connected in pairs, and each pair connected so as to shunt one pair only of consecutive series connected capacitors in one of the D.C. paths; and (k) a connection between the junction point of each pair of shunting rectifiers and the junction point of the pair of capacitors in the other D.C. path which correspond to the two capacitors which this pair of rectifiers is shunting, whereby the reservoir capacitor tends to charge to $(n+1)$ times the peak value of the voltage applied to the input terminals.

2. A voltage multiplier rectifier circuit according to claim 1, in which the shunting rectifiers are metal rectifiers and these shunting rectifiers are associated with variable resistor means by adjustment of which inequalities in the performance of these metal rectifiers can be balanced out.

3. A voltage multiplier rectifier circuit according to claim 1, in which one of the two output terminals is earthed.

4. A voltage multiplier rectifier circuit according to claim 1, in which in each series chain the rectifier connected to a first of the two output terminals is a vacuum tube diode.

5. A voltage multiplier rectifier circuit according to claim 4, in which the second of the two output terminals is earthed.

No references cited.

JOHN F. COUCH, *Primary Examiner.*

M. WACHTELL, *Assistant Examiner.*